United States Patent
Sureka et al.

(10) Patent No.: US 12,299,175 B1
(45) Date of Patent: May 13, 2025

(54) SYSTEMS AND METHODS FOR GENERATING AN EXECUTION WEBPAGE WITH DYNAMICALLY UPDATED CUSTOMIZED OPTIONS

(71) Applicant: CITICORP CREDIT SERVICES, INC. (USA), Jacksonville, FL (US)

(72) Inventors: Ashutosh Sureka, Coppell, TX (US); Kartik Chandrasekharan, Jersey City, NJ (US); Shadman Zafar, Plano, TX (US); Shafiq Kassam, Lewisville, TX (US)

(73) Assignee: CITICORP CREDIT SERVICES, INC. (USA), Jacksonville, FL (US)

( * ) Notice: Subject to any disclaimer, the term of this patent is extended or adjusted under 35 U.S.C. 154(b) by 0 days.

(21) Appl. No.: 18/655,735

(22) Filed: May 6, 2024

Related U.S. Application Data

(63) Continuation-in-part of application No. 17/387,581, filed on Jul. 28, 2021, now abandoned.

(51) Int. Cl.
  *G06F 21/62* (2013.01)
  *G06Q 20/24* (2012.01)

(52) U.S. Cl.
  CPC ......... *G06F 21/6263* (2013.01); *G06Q 20/24* (2013.01)

(58) Field of Classification Search
  CPC ...... G06Q 20/24; G06Q 20/12; G06Q 20/102; G06Q 20/10; G06Q 20/40; G06Q 30/0601; G06Q 30/0635; G06Q 30/0637; H04L 63/102; H04L 63/108; H04L 67/535
  See application file for complete search history.

(56) References Cited

U.S. PATENT DOCUMENTS

| | | | |
|---|---|---|---|
| 9,754,245 B1 | 9/2017 | Davison et al. | |
| 10,417,706 B1* | 9/2019 | Simon | G06Q 30/0643 |
| 11,710,179 B1* | 7/2023 | Kaditz | G06Q 30/0641 705/38 |
| 2014/0201043 A1 | 7/2014 | Arditi et al. | |
| 2015/0081534 A1* | 3/2015 | Zamer | G06Q 20/102 705/40 |
| 2015/0278946 A1* | 10/2015 | Don | G06Q 20/24 705/38 |
| 2016/0189121 A1* | 6/2016 | Best | G06Q 20/102 705/40 |
| 2016/0234195 A1 | 8/2016 | Fausak et al. | |
| 2016/0321634 A1* | 11/2016 | George | G06Q 20/202 |
| 2017/0004573 A1* | 1/2017 | Hussain | G06Q 20/40 |

(Continued)

*Primary Examiner* — Tae K Kim
(74) *Attorney, Agent, or Firm* — Foley & Lardner LLP

(57) ABSTRACT

Described herein are methods and systems to dynamically generate interactive graphical interfaces. Upon receiving a selection to display an execution page, a webserver may (1) transmit a request for a user identifier and (2) transmit a request for one or more options for a user. The webserver may receive an array including one or more options and instructions to display the one or more installment options on the execution page. Upon extracting the one or more options from the array, the webserver dynamically revises the webpage with at least one interactive graphical element having a visual characteristic of the webpage. Responsive to a second selection of the at least one interactive graphical element on the webpage, the webserver displays the one or more options as selectable graphical components having the visual characteristic of the webpage.

20 Claims, 6 Drawing Sheets

(56) References Cited

U.S. PATENT DOCUMENTS

| | | | |
|---|---|---|---|
| 2017/0193497 A1* | 7/2017 | Macedo | G06Q 20/3572 |
| 2017/0278085 A1* | 9/2017 | Anderson | G06Q 20/12 |
| 2018/0121893 A1* | 5/2018 | Zamer | G06Q 20/12 |
| 2019/0236577 A1* | 8/2019 | Schmid | G06Q 20/24 |
| 2019/0392443 A1* | 12/2019 | Piparsaniya | G06Q 20/405 |
| 2020/0264766 A1 | 8/2020 | Hameed et al. | |
| 2021/0012417 A1* | 1/2021 | Atieque | G06Q 20/24 |
| 2021/0286930 A1* | 9/2021 | Clark | G06F 40/103 |
| 2022/0237610 A1* | 7/2022 | Badal-Badalian | G06Q 20/12 |
| 2024/0020674 A1* | 1/2024 | Srivastava | G06Q 20/405 |
| 2024/0054473 A1* | 2/2024 | Bongner | G06Q 20/102 |

\* cited by examiner

500

510 — Responsive to an input on a merchant webpage from a user, transmitting, by a webserver hosting the merchant webpage to a first server, a request to display at least one interactive graphical element corresponding to an installment payment option on the webpage and a payment card number inputted by the user, whereby the first server: identifies an existing profile based on the payment card number without using personally identifiable information, and calculates an attribute of the installment payment option for the user based on the existing profile and without an input of personally identifiable information from the user.

520 — Receiving, by the webserver from the first server, instructions to insert the at least one interactive graphical element comprising the installment payment option on the webpage having a visual characteristic of the webpage.

530 — Dynamically revising, by the webserver, the webpage upon the input, the at least one interactive graphical element configured for selection by the user, whereby responsive to a selected interactive graphical element on the webpage, the server transmit an instruction to execute the installment payment option based on the selected interactive graphical element to a second server.

FIG. 5

SYSTEMS AND METHODS FOR GENERATING AN EXECUTION WEBPAGE WITH DYNAMICALLY UPDATED CUSTOMIZED OPTIONS

TECHNICAL FIELD

This application relates generally to dynamic interactive graphical user interfaces that are customized for consumers without transmitting personally identifiable information.

BACKGROUND

Traditional payment methods suffer from various technical problems, including data chasms in which distributed servers of a payment system are unable to freely access stored data between the distributed servers, security concerns during data receipt and transmission of sensitive information, and difficulties in providing seamless integration of disparate server outputs into a unitary webpage having a consistent look and feel.

Traditional payment methods fail to effectively leverage user data and profiles stored across multiple discrete servers and data storage locations. As such, conventional payment methods rely upon multiple user profiles for a single user, spread across various servers and data storage locations. This results in wasted data storage and processing resources as processors must analyze and parse through increasingly voluminous data records. Additionally, data stored across multiple locations provides an increased risk of exposure to a data leak. Beyond the security concerns associated with storing sensitive information across multiple locations, security threats arise during data entry. Thus, conventional payment systems that rely on repetitious data entry pose security threats both from the external world by prying eyes and the digital world during transmission of the sensitive data.

Providing seamless integration of various outputs from discrete servers proves technically difficult due to various compatibility and integration requirements between servers and webservers. For example, traditional payment systems have attempted to integrate third-party installment options into a checkout process but have failed to maintain a consistent look and feel across the presented installment options generated by a first server and the remaining merchant data generated by a second server.

SUMMARY

For the aforementioned reasons, there is a desire for an electronic platform that seamlessly integrates customized (e.g., personalized) options into a checkout process utilizing traditionally inaccessible merchant-collected user data, without compromising user privacy, and without requiring manual input of sensitive information. Described herein are methods and systems to dynamically revise an electronic platform (e.g., website) to display customized alternative (e.g., installment) payment options without directing users to a new page and without requesting personally identifiable information or other sensitive data. Additionally, the methods and systems described herein reduce data entry time and decrease the likelihood of cart abandonment.

In some aspects, the techniques described herein relate to a method including: responsive to receiving, by a webserver from a user device, a selection on a merchant webpage hosted by the webserver, wherein the selection corresponds with a request to display an execution webpage to conclude a browsing session: transmitting, by the webserver to a merchant database, a request for a user identifier corresponding to a user associated with the browsing session; and transmitting, by the webserver to a first server, a request for one or more installment options for the user, wherein the request does not include personally identifiable information received from the user device during the browsing session; receiving, by the webserver from the first server, an array including one or more installment options and instructions to insert the one or more installment options on the merchant webpage, the one or more installment options determined by the first server based on an existing profile associated with the user identifier; and dynamically revising, by the webserver, the merchant webpage upon extracting the one or more installment options from the array of the one or more installment options received from the first server, the dynamically revised merchant webpage including at least one interactive graphical element having a visual characteristic of the merchant webpage and configured for selection by the user device, whereby responsive to a second selection of the at least one interactive graphical element on the merchant webpage, presenting, by the webserver, for display, the one or more installment options as selectable graphical components having the visual characteristic of the merchant webpage.

In some aspects, the techniques described herein relate to a method, wherein the webserver communicates with the first server through a pluggable component.

In some aspects, the techniques described herein relate to a method, wherein the webserver communicates with the first server through an application programming interface.

In some aspects, the techniques described herein relate to a method, wherein the first server calculates an attribute for each of the one or more installment options for the user based on the existing profile, wherein the attribute for each of the one or more installment options is one of a monthly amount, a number of installments, or an interest rate.

In some aspects, the techniques described herein relate to a method, wherein the existing profile is associated with the first server and the first server determines the one or more installment options based on data associated with the user that is included in the existing profile.

In some aspects, the techniques described herein relate to a method, wherein the user identifier is a credit card number.

In some aspects, the techniques described herein relate to a method, wherein the execution webpage is a checkout page of a merchant associated with the browsing session.

In some aspects, the techniques described herein relate to a method, further including: receiving, by the webserver from the user device, a third selection of an installment option from the one or more installment options; and transmitting, by the webserver to a second server, instructions to execute the installment option.

In some aspects, the techniques described herein relate to a system including: a first server; and a webserver, the webserver including one or more processors and machine-readable, non-transitory computer media that when read by the one or more processors, cause the one or more processors to execute a method including: responsive to receiving, by the webserver from a user device, a selection on a merchant webpage hosted by the webserver, wherein the selection corresponds with a request to display an execution webpage to conclude a browsing session: transmitting, by the webserver to a merchant database, a request for a user identifier corresponding to a user associated with the browsing session; and transmitting, by the webserver to a first server, a request for one or more installment options for the user, wherein the request does not include personally identifiable information received from the user device during the browsing session; receiving, by the webserver from the first server, an array including one or more installment options and instructions to insert the one or more installment options on the merchant webpage, the one or more installment options determined by the first server based on an existing profile associated with the user identifier; and dynamically revising, by the webserver, the merchant webpage upon extracting the one or more installment options from the array of the one or more installment options received from the first server, the dynamically revised merchant webpage including at least one interactive graphical element having a visual characteristic of the merchant webpage and configured for selection by the user device, whereby responsive to a second selection of the at least one interactive graphical element on the merchant webpage, presenting, by the webserver, for display, the one or more installment options as selectable graphical components having the visual characteristic of the merchant webpage.

In some aspects, the techniques described herein relate to a system, wherein the webserver communicates with the first server through a pluggable component.

In some aspects, the techniques described herein relate to a system, wherein the webserver communicates with the first server through an application programming interface.

In some aspects, the techniques described herein relate to a system, wherein the first server calculates an attribute for each of the one or more installment options for the user based on the existing profile, wherein the attribute for each of the one or more installment options is one of a monthly amount, a number of installments, or an interest rate.

In some aspects, the techniques described herein relate to a system, wherein the existing profile is associated with the first server and the first server determines the one or more installment options based on data associated with the user that is included in the existing profile.

In some aspects, the techniques described herein relate to a system, wherein the user identifier is a credit card number.

In some aspects, the techniques described herein relate to a system, wherein the execution webpage is a checkout page of a merchant associated with the browsing session.

In some aspects, the techniques described herein relate to a system, further including: receiving, by the webserver from the user device, a third selection of an installment option from the one or more installment options; and transmitting, by the webserver to a second server, instructions to execute the installment option.

In some aspects, the techniques described herein relate to a method including: responsive to receiving, by a webserver from a user device, a selection on a merchant webpage hosted by the webserver, wherein the selection corresponds with a request to display an execution webpage to conclude a browsing session: transmitting, by the webserver to a merchant database, a request for a user identifier corresponding to a user associated with the browsing session; and transmitting, by the webserver to a first server, a request for one or more installment options for the user, wherein the request does not include personally identifiable information received from the user device during the browsing session; receiving, by the webserver from the first server, an array including one or more installment options and instructions to insert the one or more installment options on the merchant webpage, the one or more installment options determined by the first server based on an existing profile associated with the user identifier; and dynamically revising, by the webserver, the merchant webpage upon extracting the one or more installment options from the array of the one or more installment options received from the first server, the dynamically revised merchant webpage including at least one interactive graphical element corresponding to an installment option of the one or more installment options and having a visual characteristic of the merchant webpage and configured for selection by the user device, whereby responsive to a second selection of the at least one interactive graphical element on the merchant webpage, transmitting, by the webserver to a second server, instructions to execute the installment option.

In some aspects, the techniques described herein relate to a method, wherein the webserver communicates with the first server through a pluggable component.

In some aspects, the techniques described herein relate to a method, wherein the webserver communicates with the first server through an application programming interface.

In some aspects, the techniques described herein relate to a method, wherein the first server calculates an attribute for each of the one or more installment options for the user based on the existing profile, wherein the attribute for each of the one or more installment options is one of a monthly amount, a number of installments, or an interest rate.

It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification, illustrate an embodiment of the invention, and, together with the specification, explain the invention.

FIG. 5 illustrates a flowchart depicting operational steps for dynamically revising a webpage with consumer-customized payment options, in accordance with an embodiment.

DETAILED DESCRIPTION

Figure 1:
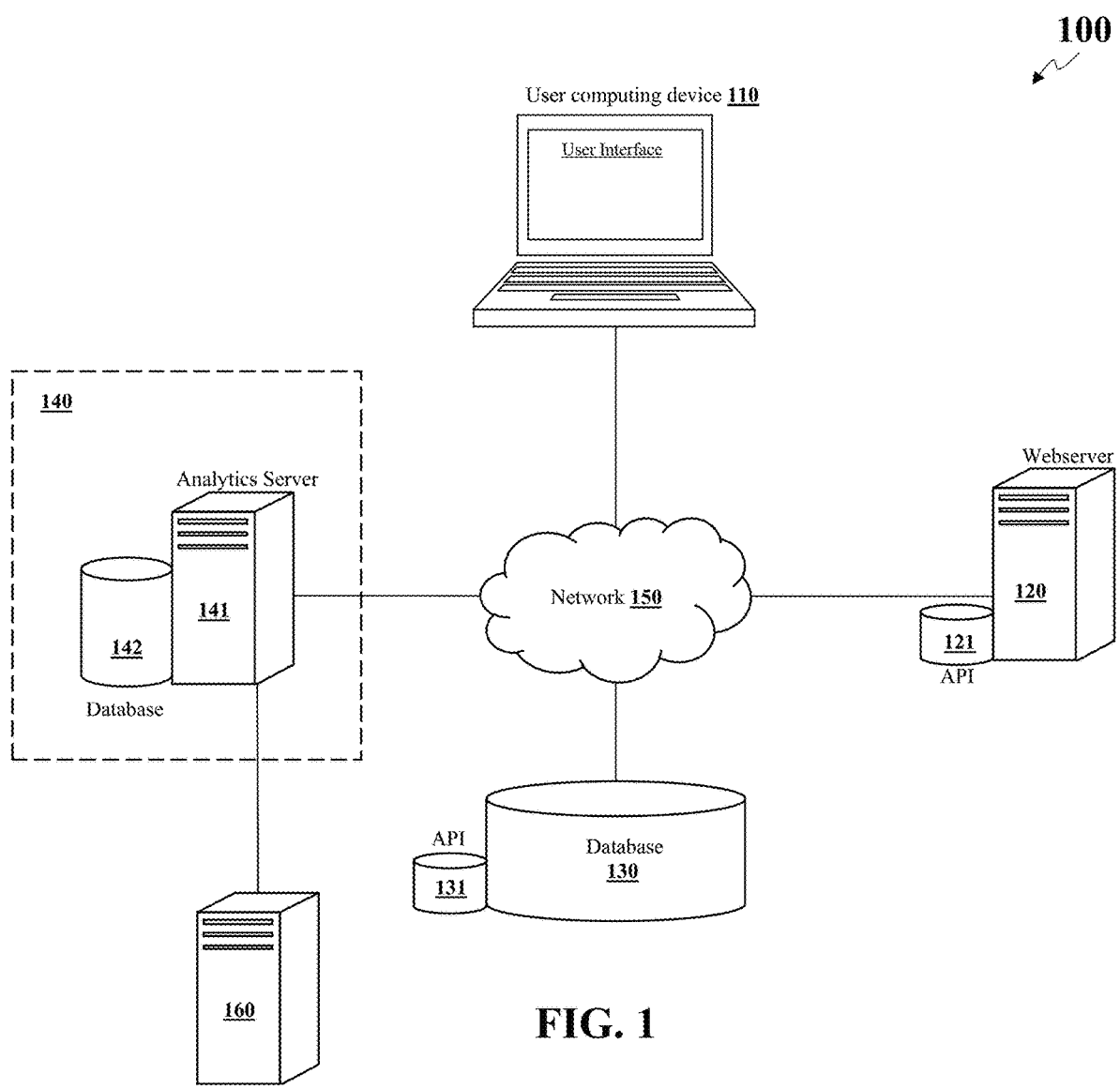
FIG. 1 illustrates a computer system for dynamically revising a webpage with consumer-customized payment options, in accordance with an embodiment.

Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to a person skilled in the relevant art and having possession of this disclosure, are to be considered within the scope of the invention.

FIG. 1 illustrates various components of a system 100 for dynamically revising webpages with consumer-customized payment options, in accordance with an embodiment. The system 100 provides a non-limiting example of a computer system having various features that can be utilized to dynamically revise one or more webpages with consumer-customized payment options. The system 100 may be utilized by third party webserver (e.g., webserver 120) to incorporate graphical elements generated by the analytics server 141. In some configurations, the graphical elements generated by the analytics server 141 may be incorporated into one or more webpages hosted by the webserver 120. In other configurations, the graphical elements generated by the analytics server 141 may be directly displayed onto the end users' computing devices (e.g., user-computing device 110).

The system 100 may include an analytics server 141, webserver 120, database 130, and user-computing device 110. These features may communicate with each other over a network 150. The network 150 may include, but is not limited to, private or public local area network, wireless local area network, metropolitan area network, wide-area network, and the Internet. The network 150 may further include both wired and wireless communications according to one or more standards via one or more transport mediums. The communication over the network 150 is in accordance with various communication protocols such as transmission control protocol and internet protocol, user datagram protocol, and Institute of Electrical and Electronics Engineers communication protocols. The network 150 may further include wireless communications according to Bluetooth specification sets, or another standard or proprietary wireless communication protocol. The network 150 may further include communications over a cellular network, including, for example, a global system for mobile communications, code division multiple access, and enhanced data for global evolution network.

The system 100 may operate in a local computing environment where the user-computing device 110 may execute an application to access an electronic platform generated/hosted by the webserver 120. An example of an electronic platform may be a website accessible through a browser application. For instance, the user-computing device 110 may execute a browser application and access a website hosted by the webserver 120. Even though some embodiments described herein focus on a website hosted by the webserver, the methods and systems described herein are not limited to websites. For instance, the webserver may also host/generate an application accessible by the user-computing device 110 (e.g., internal application native to an organization where an employee operating the user-computing device 110 may access or a mobile application accessed by the user-computing device 110). The methods and systems described herein apply to generating various graphical elements that are customized to a user operating the user-computing device 110. These graphical elements may be embedded into other graphical elements and/or applications, such as embedded within a website or any other application.

The system 100 may operate in a cloud-computing environment where the user-computing device 110 may be cloud-optimized. The user-computing device 110 data may execute the browser application and access graphical user interfaces and elements generated by the analytics server 141. The graphical user interfaces and elements generated by the analytics server 141 (e.g., services provided by the analytics server 141) may be stored and executed on a remote cloud-based analytics server 141 accessed over a network cloud. In the cloud-computing environment, a web browser on the user-computing device 110 may interface with an application program associated with the analytics server 141, which is executed remotely via cloud-based technology.

The analytics server 141 may be any computing device capable of performing the actions described herein. For instance, the analytics server 141 may include a processing unit, and a non-transitory machine-readable storage medium. The processing unit may include a processor with a computer-readable medium, such as a random access memory coupled to the processor. The analytics server 141 may be executing algorithms or computer executable program instructions, which may be executed by a single processor or multiple processors in a distributed configuration. The analytics server 141 may be configured to interact with one or more software modules of a same or a different type operating within the system 100.

Non-limiting examples of the processor may include a microprocessor, an application specific integrated circuit, and a field programmable object array, among others. The analytics server 141 is capable of executing data processing tasks, data analysis tasks, and valuation tasks. Non-limiting examples of the analytics server 141 may include a desktop computer, a server computer, a laptop computer, a tablet computer, and the like. For case of explanation, the FIG. 1 depicts a single server computing device functioning as the analytics server 141. However, some embodiments may include a plurality of server computing devices capable of performing various tasks described herein.

The analytics server 141 may utilize a database, such as the database 142, to store and/or retrieve various data described herein. For instance, the analytics server 141 may store different data corresponding to different payment options and payment attributes (e.g., number of installments, annual percentage rates of loans, and other terms and conditions) within the database 142. The database 142 may also include data associated with the user operating the user-computing device 110. The database 142 may also include customer information, such as customer's personally identifiable information (e.g., name, age, and other demographic data) and payment information (e.g., card numbers or other unique identifiers associated with customer's payment card and other payment information). The analytics server 141 may also retrieve data (e.g., demographic and/or financial) data associated with the user requesting the electronic form. For instance, the database 142 may include user data (e.g., previously populated by the analytics server 141 and/or periodically retrieved from a third-party data source).

The analytics server 141 and the database 142 may represent a secondary organization's server and database. The secondary organization 140 may be an organization offering dynamic revisions of webpages (e.g., checkout pages) for the webserver 120. An example of the secondary organization 140 may include a financial institution, such as a bank. In a non-limiting example, the webserver 120 may generate/host a website for a merchant offering products and services. The analytics server 141 may utilize the methods and systems described herein to revise the merchant's webpage and display customized payment information accordingly.

The analytics server 141 may use various application programming interfaces (APIs) to communicate with different features described herein. An API, as used herein, refers to a computing interface that uses connector programming code to act as a software intermediary between at least two computing components/features described herein. The API may automatically and/or periodically transfer various calls, instructions, and/or requests among different features of the system 100. Using different APIs, the analytics server 141 may automatically transmit and/or receive calls and instruction. For instance, the analytics server 141 may use API 121 to communicate with the webserver 120, such that when a user operating the user-computing device 110 requests a particular purchase, the API 121 automatically transmits an instruction to the analytics server 141. The instruction may include data needed for the analytics server 141 to generate and display the graphical elements described herein. The analytics server 141 may also use the API 131 to communicate with the database 130.

The API 131 and/or 121 may be two-way APIs. A two way API refers to an API that allows information to be transmitted back and forth between at least two features of the system 100. For instance, when a user operating the user computing device 110 requests a purchase via a website hosted by the webserver 120, the API 121 may generate a call instructing the analytics server 141 to analyze the data and display customer-specific payment information accordingly. The call may include data associated with the user requesting the purchase.

The analytics server 141 may also use the API 121 to transmit a second call to the webserver 120. The second call may include instructions to display the generated graphical elements (e.g., software code defining the graphical elements and instructing the webserver 120 to embed the graphical elements within one or more webpages). As the webserver 120 displays the graphical elements, the analytics server 141 may use the API 121 to receive user inputs. The analytics server may similarly use a two-way API to communicate with the database 130.

Additionally or alternatively, the analytics server may use a content delivery network (CDN) to ensure data integrity when communicating with different features described in the system 100. A CDN, as described herein, refers to a distributed delivery network of proxy servers/nodes that uses multi-layered delivery methods/systems to transmit data (e.g., Akamai). The analytics server 141 may use a CDN when communicating various calls/instructions with the webserver 120 (directly or via the API 121) and/or the database 130 (directly or via the API 131).

The webserver 120 may be a computing device hosting a website (or any other electronic platform) accessible to the user-computing device 110 via the network 150. The webserver 120 may include a processing unit and non-transitory machine-readable storage capable of executing various tasks described herein. The processing unit may include a processor with a computer-readable medium, such as a random access memory coupled to the processor. Non-limiting examples of the processor may include a microprocessor, an application specific integrated circuit, and a field programmable object array, among others. Non-limiting examples of the webserver 120 may include workstation computers, laptop computers, server computers, laptop computers, and the like. While the system 100 includes a single webserver 120, in some embodiments the webserver 120 may include a number of computing devices operating in a distributed computing environment.

The webserver 120 may be executing algorithms or computer executable program instructions, which may be executed by a single processor or multiple processors in a distributed configuration. The webserver 120 may be configured to interact with one or more software modules of a same or a different type operating within the system 100. For instance, the webserver 120 may execute software applications configured to host an electronic platform, which may generate and serve various webpages to the user-computing device 110. The electronic platform may also embed various graphical user interfaces generated by the analytics server 141.

The webserver 120 may execute software applications configured to display the user interfaces described herein (e.g., host a website that displays graphical user interfaces and other graphical elements generated by the analytics server 141), which may generate and serve various webpages to user-computing device 110. The analytics server 141 and/or the webserver 120 may be configured to require user authentication based upon a set of user authorization credentials (e.g., usernames, passwords, biometrics, cryptographic certificates, and the like). In such implementations, the analytics server 141 and/or the webserver 120 may access a system database (e.g., database 130) configured to store user credentials, which the analytics server 141 and/or the webserver 120 may be configured to reference in order to determine whether a set of entered credentials (purportedly authenticating the user) match an appropriate set of credentials that identify and authenticate the user.

The analytics server 141 and/or the webserver 120 may generate and host webpages onto the user-computing device 110 based upon a user's role within the system 100. In such implementations, the user's role may be defined by data fields and input fields in user records stored in the database 130. The analytics server 141 and/or the webserver 120 may authenticate the user and may identify the user's role by executing an access directory protocol (e.g., Lightweight Directory Access Protocol (LDAP)). In addition to authenticating a user, the analytics server 141 and/or the webserver 120 may identify a profile associated with the user and analyze the data, such that the graphical elements are customized for each user.

The webserver 120 may generate and serve webpages to the user-computing device 110 based upon information associated with the user and structure of the interactive graphical elements of the user-computing device 110. The information associated with the user may be defined by data fields in user records stored in the local memory or database, such as the database 142 and/or database 130.

The user-computing device 110 is a computing device including a processing unit. The processing unit may execute a valuation software application or a web browser application that accesses or receives data records from the database 130. The processing unit may include a processor with computer-readable medium, such as a random access memory coupled to the processor. The user-computing device 110 may be running algorithms or computer executable program instructions, which may be executed by a single processor or multiple processors in a distributed configuration. The user-computing device 110 may interact with one or more software modules of a same or a different type operating within the system 100.

Non-limiting examples of the processor may include a microprocessor, an application specific integrated circuit, and a field programmable object array, among others. Non-limiting examples of the user-computing device 110 may include a server computer, a workstation computer, a tablet device, and a mobile device (e.g., smartphone, PDA). An end user (inputting the data or filling out the electronic form) may operate the user-computing device 110. The user may be a client of a financial company. For case of explanation, FIG. 1 illustrates a single computing device functioning as the user-computing device 110. However, some embodiments may include a plurality of computing devices capable of performing the tasks described herein.

The database 130 associated with the analytics server 141, the webserver 120, and the user-computing device 110 is capable of storing information in various formats and/or encrypted versions. The information may include data records associated with various companies utilizing the webserver 120, data records associated with the webserver 120, and data records associated with different users (e.g., customer profiles having personally identifiable information, financial information, and any other information necessary to determine a customized financing option for the user). The database 130 may also store data associated with user preferences, attributes associated with various graphical elements to be generated by the analytics server 141, and the like. The database 130 may have a logical construct of data files, which are stored in non-transitory machine-readable storage media, such as a hard disk or memory, controlled by software modules of a database program (e.g., SQL), and a database management system that executes the code modules (e.g., SQL scripts) for various data queries and management functions. Even though the database 130 is shown as a separate computing feature, the database 130 may be a part of a computing environment that includes the webserver 120. For instance, the database 130 and the webserver 120 may belong to a merchant computing environment where the webserver 120 retrieves merchant data from the database 130 to host a website.

Utilizing the web browser executing on the user-computing device 110, a user may generate a request that can be transmitted to the analytics server 141 and/or the webserver 120. Specifically, the user may request to fill out an electronic form and submit the form using a website generated by the webserver 120. As a result, the webserver 120 may instruct the analytics server 141 to generate a chat-like intelligent data input form to collect the user's information. The request may also include data associated with the user (e.g., demographic data and/or user preferences) and data associated with the user's request (e.g., purchase price).

The analytics server 141 may then generate various graphical user interfaces and graphical elements that represent customized payment information for the user operating the user-computing device 110. The analytics server 141 may then generate various interactive graphical user interfaces and elements and may instruct the webserver 120 to incorporate the generated graphical user interfaces and elements within the website displayed on the user-computing device 110. The analytics server 141 and/or webserver 120 may display the graphical user interfaces an elements generated by the analytics server 141 in a manner that is indistinguishable from the website hosted by the webserver 120. For instance, the graphical user interfaces and elements generated by the analytics server 141 may be implemented/embedded within the website generated/hosted by the webserver 120, such that they share the same look and feel. In this way, the user is not directed to a new webpage and the interaction with the customized payment options is seamless.

The analytics server 141 and/or webserver 120 may monitor the user's interactions with the graphical user interfaces and elements generated by the analytics server 141. For instance, the analytics server 141 and/or the webserver 120 may record data inputted by the user and may transmit the recorded data (e.g., a submitted application) to another server for processing. For instance, the analytics server may determine which payment option was selected by the user and may transmit the selection to another server to facilitate the transaction.

In operation, the analytics server 141 may provide a pluggable software component to be installed and executed by a merchant utilizing the webserver 120 to host a merchant website. Upon installation, a system administrator may configure the pluggable component using various preferences and defined criteria. For instance, the system administrator may customize the pluggable component, such that graphical elements and components have the same look and feel of the merchant's website. Additionally, the system administrator may customize the locations of the elements to be displayed by the pluggable component.

A pluggable component (also known as a plug-in) may be a software component that adds a specific feature to an existing computer program utilized and executed by the webserver 120. The analytics server 141 may provide services discussed herein via the pluggable component. The analytics server may implement plug-in functionality using shared libraries that get dynamically loaded at run time and installed in a place prescribed by the host application (e.g., stored within the database 142 and/or 130). The pluggable component may be in direct communication with the analytics server 141, such that the analytics server 141 can determine whether the user/customer has requested alternative payment options (e.g., installment payment options). The analytics server 141 can also display various graphical elements and components discussed herein using the pluggable component. In this way, the analytics server 141 can instruct the webserver 120 to display different components within the merchant website.

After the initial setup, the webserver 120 can continue hosting the merchant website. When a user reaches a defined page (e.g., a checkout page), the pluggable component may gather user data and transmit a notification to the analytic server 141. The pluggable component may first request an authorization from the webserver 120 before interacting with the user or displaying any data. For instance, the pluggable component may transmit a token (GetAccessToken command) to the webserver 120 or a merchant server. Using the token, the webserver 120 may authenticate the analytics server 141 and authorize it to display the graphical component discussed herein. Upon a successful authorization, the pluggable component may then transmit a command to the webserver 120 (GetCustomerAccountInfo). In this way, the pluggable component may transmit unique identifier of the user (e.g., user's credit card number) to the analytics server. The analytics server 141 may then use the user's unique identifier to identify a customer profile within the database 142 (or database 130) and retrieve data associated with the user. Based on the retrieved data, the analytics server 141 (or a third party server) may generate installment payment options for the user and may utilize the pluggable component to display various graphical elements and components representing those options.

After receiving a selection from the user, the analytics server 141 may transmit the selection and other transaction data (e.g., purchase price) to a secondary server 160. The secondary server 160 may then facilitate the transaction by transmitting a monetary amount (e.g., purchase price) to an account of the merchant. Even though the analytics server 141 and the secondary server 160 are shown as two separate servers, in some embodiments, the functionality attributed to the secondary server 160 may be performed by the analytics server 141. For instance, the analytics server 141 may display installment payment options, receive a selection, and facilitate the transaction by transmitting the purchase price to a merchant account. The analytics server 141 may then revise a data record within the database 142 and/or 130 recording the user's new debt obligation.

Figure 2:
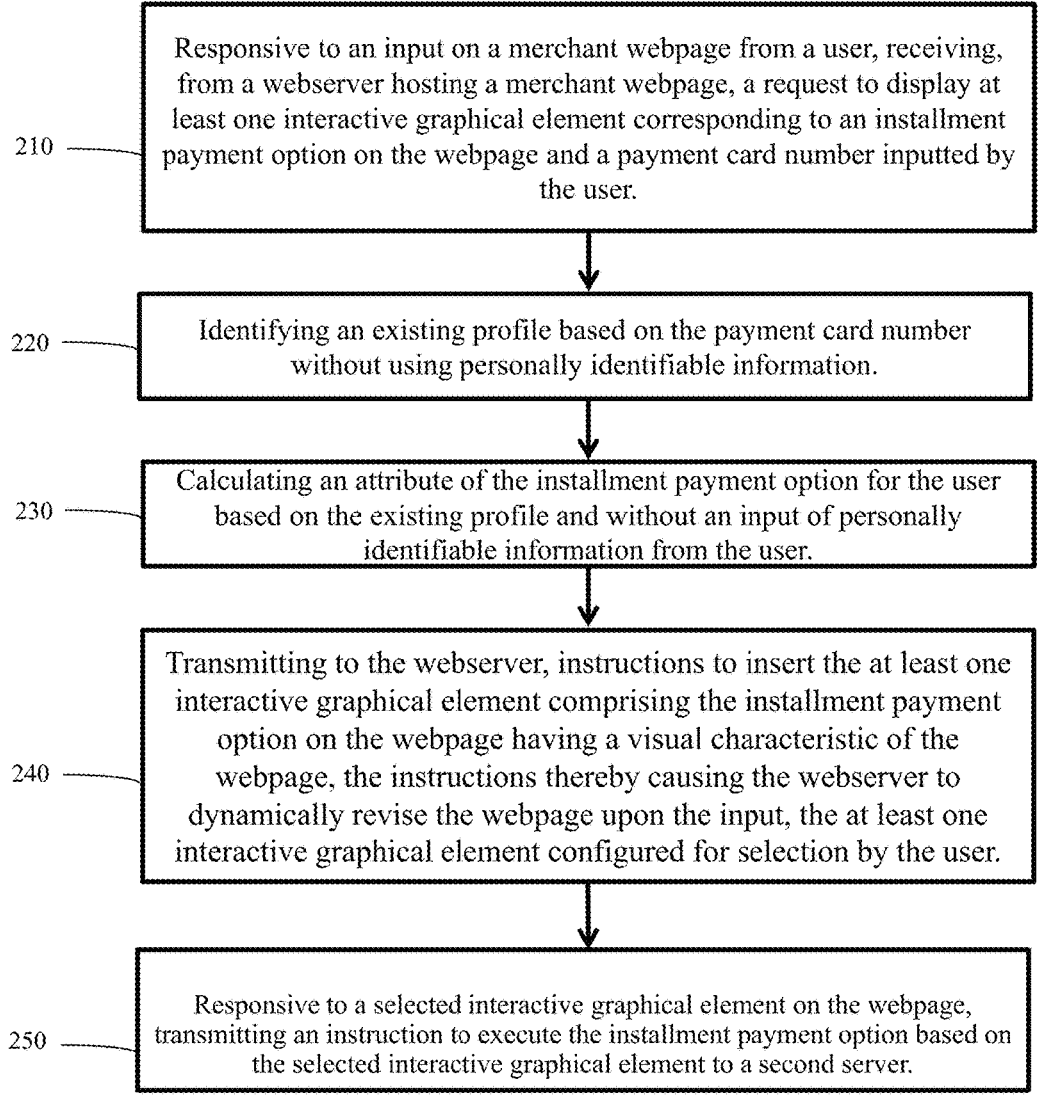
FIG. 2 illustrates a flowchart depicting operational steps for dynamically revising webpage with consumer-customized payment options, in accordance with an embodiment.

FIG. 2 illustrates a flowchart depicting operational steps for dynamically revising webpage with consumer-customized payment options, in accordance with an embodiment. The method 200 describes how a server, such as the analytics server described in FIG. 2, displays various customer-specific interactive graphical user interfaces and elements configured to receive users' inputs. Even though the method 200 is described as being executed by the analytics server, the method 200 can be executed by any server and/or locally within a user's computing device or as a browser extension. Additionally or alternatively, the method 200 can be executed by a webserver acting as both a webserver and the analytics server by hosting the website and generating the graphical elements described herein. Furthermore, other configurations of the method 200 may comprise additional or alternative steps, or may omit one or more steps altogether.

At step 210, the analytics server may receive, from a webserver hosting a merchant webpage responsive to an input on the merchant webpage from a user, a request to display at least one interactive graphical element corresponding to an installment payment option on the webpage and a payment card number inputted by the user.

The analytics server may receive a request from a webserver to generate one or more graphical elements that are customized for a user operating the user device. The graphical elements may be configured to display payment options associated with a purchase initiated by the user. The transaction may be between the user operating the user device and an entity associated with the webserver (e.g., webserver of a merchant). The request may be generated and transmitted by the webserver hosting a website accessed by a user on their user device. For instance, a user may initiate a web browser application and access a website generated/hosted by webserver. Non-limiting examples of websites may include merchant websites providing goods and services to users on the World Wide Web.

In a non-limiting example, a user may interact with a graphical element displayed within the website hosted by the webserver and indicate a desire to purchase an item or acquire a service. For instance, the user may access a checkout page and indicate a desire to check out by completing a transaction (e.g., submitting payment information to purchase the product or services). In order to complete the transaction, the user may be required to provide payment data. For instance, the user may be required to provide authentication credentials to a payment processing service (e.g., login/password to an e-wallet or a website that facilitates secure payments). In another example, the user may be required to enter payment information, such as credit card number and other identifying information. In yet another embodiment, the user may have previously saved their payment information with the merchant. As a result, the webserver may access the payment data and may pre-populate one or more input elements configured to receive user's payment information. The user may then select a payment option (e.g., credit card) from a list of previously saved payment options.

The checkout page may also include an input element configured to receive an indication that the user desires to view installment payment options. A non-limiting example of an installment payment option may include installment plans or a personal loan underwritten by a third-party, or in some embodiments, by a payment processing entity. For instance, the checkout page may include an input element (e.g., radio button or an interactive hyperlink) prompting the user to interact with the input element if interested in an installment payment option.

Upon the user indicating that they are interested in an installment payment option, the webserver may transmit a notification to the analytics server. The notification may be an electronic message that includes the user's payment data. For instance, if the user has entered their payment data or if the merchant (or any database associated with the merchant or the webserver) has access to previously saved payment information (e.g., user has previously saved their payment information).

The request received by the analytics server may include additional data associated with the user or the user device. For instance, before requesting to submit their application, the user may provide their demographic information. For instance, the user may login to the website provided by the webserver. As a result, the webserver may access the user's demographic data previously inputted by the user and/or retrieved from a third party. When transmitting the request to the analytics server, the webserver may include the user's demographic data and any other data included in the user's profile, such as user preferences or other data enriched by third-party data sources. The webserver may also include previous purchase history and other related data associated with the user within the request.

The webserver may also include data associated with the user's device, such as IP address, location data, MAC address, and the like. The request may also include attributes associated with the product being sold or services rendered within the request. For instance, the webserver may indicate that the user is purchasing a stationary exercise bicycle for $2300.

At step 220, the analytics server may identify an existing profile based on the payment card number without using personally identifiable information. The analytics server may use the data received from the webserver (step 210) to retrieve a customer profile associated with the user. The analytics server may not require additional data from the user. For instance, the analytics server may only use the payment card number entered by the user to execute a look up table that queries various customer profiles based on the unique identifier. As discussed herein, the unique identifier received from the webserver may be any information that was entered by the user, such as payment card number entered by the user during the transaction (e.g., or a certain credit card selected by the user that already existed within a merchant profile). In another example, the unique identifier may be the login credential (or authentication credential) provided by the user. For instance, the user may have an existing merchant account and may have previously entered various identifiers (e.g., name, address and payment information). The webserver may transmit any of the identifiers stored within the profile to the analytics server.

Upon receiving the request from the webserver, the analytics server may query and retrieve a customer profile for the user stored within a database. The customer profile may include various information necessary to identify whether the user is eligible for installment payment options. For instance, the customer profile may include data needed to determine financing options and installment plans for the use. Non-limiting examples of data included within the customer profile may include user's credit score, payment history, pending financial obligations (e.g., loans, installment payments), assets, and the like.

At step 230, the analytics server may calculate an attribute of the installment payment option for the user based on the existing profile and without an input of personally identifiable information from the user. Using the data retrieved from the customer profile, in addition to the data received from the webserver, the analytics server may calculate (or instruct another server to calculate) attribute of an installment payment option for the user. For instance, based on the user's credit worthiness, current assets and liabilities, purchase amount, and other user information, the analytics server may calculate loans terms (e.g., number of installments, down payment, and interest) for the user's requested purchase. The analytics server may not request any additional data to be inputted by the user. For instance, the analytics server may only use the data included in the customer profile of the user (step 220).

In some configurations, the analytics server (or another server) may previously have generated loans terms for the user. As a result, the analytics server may reduce calculation time by accessing the previously generated loan terms offline.

At step 240, the analytics server may transmit, to the webserver, instructions to insert the at least one interactive graphical element comprising the installment payment option on the webpage having a visual characteristic of the webpage, the instructions thereby causing the webserver to dynamically revise the webpage upon the input, the at least one interactive graphical element configured for selection by the user.

The analytics server may instruct the webserver to display one or more graphical elements within the webpage. The analytics server may display (or instruct the webserver to display) the graphical elements in accordance with predetermined and revisable visual characteristics. These visual characteristics may allow the analytics server to match the visual characteristics of other components within the webpage. For instance, the new interactive graphical element may match the same size, font, color, and other visual characteristics of other components displayed by the webserver.

The analytics server may retrieve the visual characteristics corresponding to the user preferences, merchant preferences, or of the webpage being rendered (e.g., font, text size, shape, and/or color). For instance, the webserver, user, or a system administrator may identify default visual attributes for the graphical elements and the analytics server may display various payment options and input elements having those attributes. In this way, the graphical elements generated by the analytics server maintain the look and feel of the webpage (e.g., checkout page) hosted by the webserver.

The graphical elements may be adjusted in size based on the amount of content or other criteria. Visual characteristics associated with the graphical elements may be consistent with the data retrieved from the database. For instance, the webserver may previously identify visual elements associated with the graphical user interfaces generated by the analytics server. Non-limiting examples of visual elements may include font type, font size, spacing, type of input element (e.g., radio button, text string input, and/or drop-down menu), and the like. Additionally or alternatively, a system administrator and/or the user may revise these visual elements. For instance, a user may select bigger fonts or a type of input field (e.g., some users prefer to input their responses using interactive buttons and some users prefer to type their responses).

The analytics server may instruct the webserver to embed code configured to display the graphical elements within the website generated/hosted by the webserver. In a non-limiting example, the analytics server may access software scripts (e.g., HTML code) associated with the website and may reconfigure the scripts, such that the newly generated graphical elements are embedded within the website.

The graphical elements may also include input elements configured to receive an input or a selection from the user. For instance, as described above, the graphical elements may correspond to different payment options where each graphical element displays one payment option. Therefore, each graphical element may also be an interactive button allowing the user to select the best-suited option.

At step 250, the analytics server may, responsive to a selected interactive graphical element on the webpage, transmitting, by the processor, an instruction to execute the installment payment option based on the selected interactive graphical element to a second server.

Upon displaying the graphical element, the analytics server may monitor the user's interactions with the input fields (or the graphical elements themselves). When the user interacts with one or more input elements the analytics server may transmit a notification to a second server indicating the selection made by the user. The notification may also include information about the graphical element selected by the user. For instance, the notification may include data associated with the payment or installment plan selected by the user (e.g., APR, number of installments, and the like).

The notification may also include various instructions (e.g., executable files and script) that instruct the second server to execute the selected installment plan option. The second server may add the balance (e.g., purchase price) to the user's credit card account in accordance with the selected installment option. For instance, the second server may generate a script that can automatically add each installment balance to the user's credit card account each month.

The second server may be a server configured to facilitate the installment payment option, for example, by extending credit to the user. For instance, the second server may transmit to the merchant (or an account associated with the merchant) the funds needed to complete the transaction. In this way, the second server settles the transaction for the user using the user's selected installment payment option. In some configurations, the analytics server may act as both the analytics server and the second server. Therefore, instead of transmitting the notification to the second server, the analytics server may itself settle the transaction.

Figure 3:
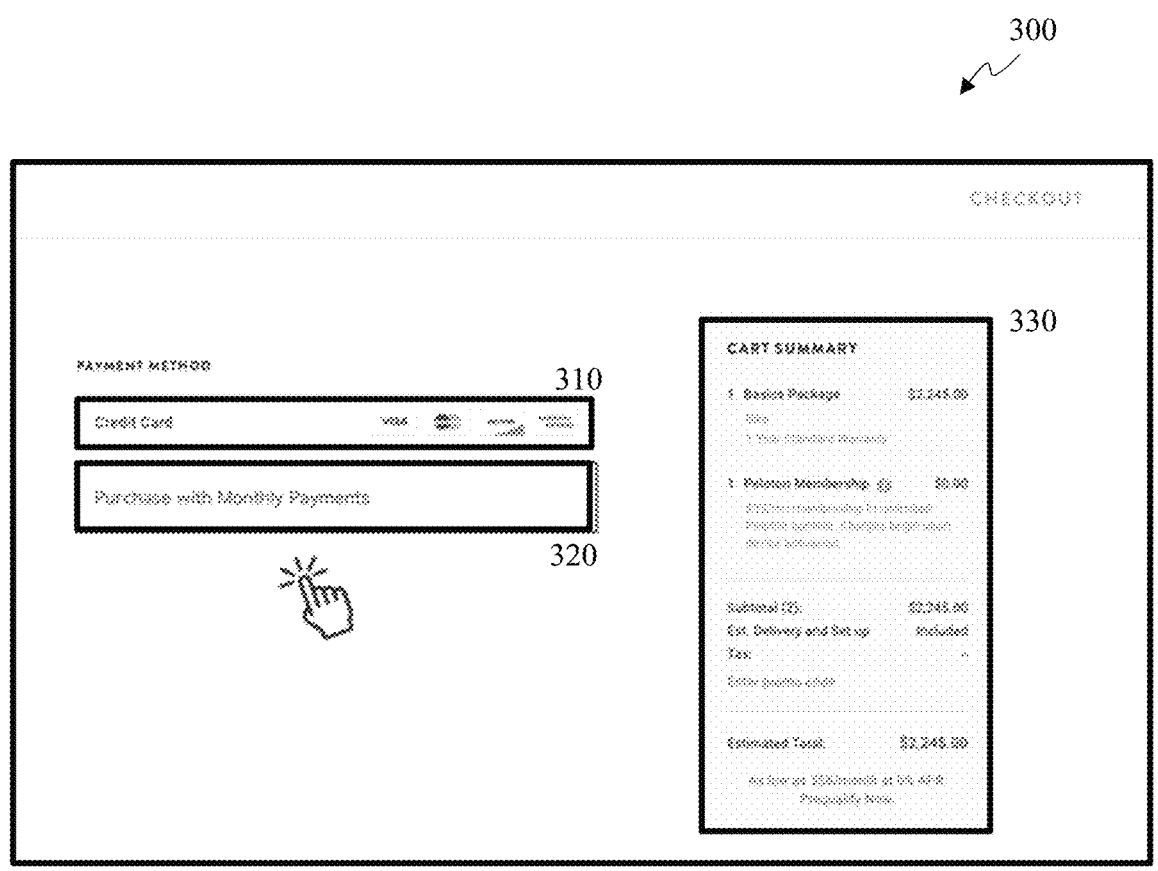
FIGS. 3-4 illustrate various graphical user interfaces and elements displayed by the analytics server, in accordance with different embodiments.
Figure 4:
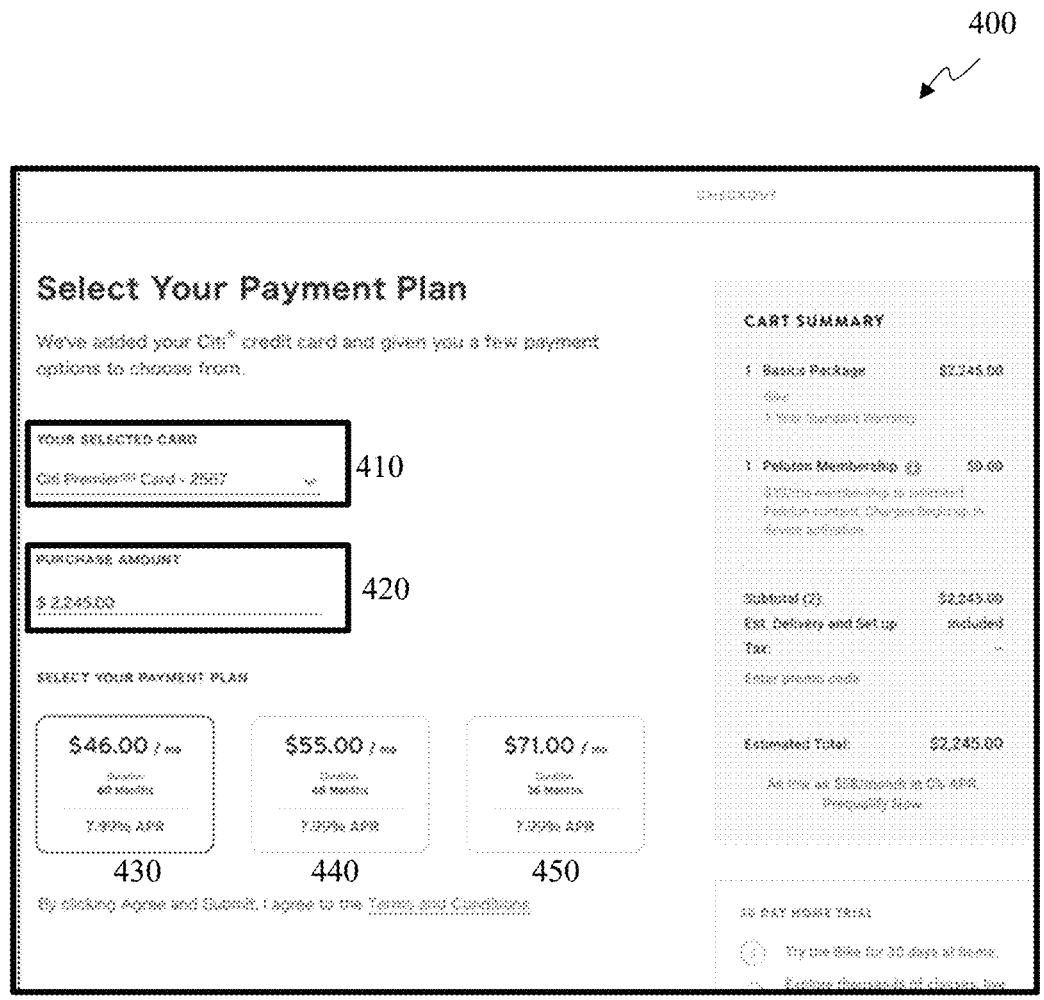

Referring now to FIGS. 3-4, non-limiting examples of the graphical user interfaces and elements described herein are illustrated. Even though FIGS. 3-4 illustrate a progression in sequential graphical user interfaces, in some configurations the analytics server may display the depicted graphical user interfaces in another order. Moreover, the analytics server may not display one or more of the graphical elements described herein. The analytics server may display various combinations and configurations of the graphical user interfaces depicted herein.

The graphical user interfaces depicted in FIGS. 3-4 illustrate one or more graphical elements displayed by the analytics server through a webserver, as described in FIG. 1. For instance, a user may log into a merchant website and request various services where a webserver associated with the website (e.g., the host for the website) may communicate the information to the analytics server. The analytics server may in turn display the graphical elements depicted herein using the "look and feel" of the third-party website. Therefore, the user may not be required to leave for a third-party website and/or initiate a new webpage generated by the analytics server. In some configurations, however, the user may be directed to a new website where the analytics server displays the graphical user interfaces and elements discussed herein. For instance, the analytics server may require additional information from the user. As a result, the analytics server (or the webserver) may direct the user to a new webpage, such that the user is presented additional prompts to input additional data (e.g., social security data or other payment information).

As depicted in FIG. 3, an end-user may initiate a web browser on an electronic device, such as their mobile device and direct the web browser to a website configured to purchase a product. After selecting the product, the webserver directs the user to the checkout page 300.

The checkout page 300 may include the graphical element 310 presenting the user options to pay with a credit card (and different types of credit cards). The checkout page 300 may also include an interactive graphical element 320 that provides the user the option to pay for the transaction via an installment payment option (e.g., purchase the product via monthly installments). The checkout page 300 may also include the graphical component 330 that display various information associated with the transition, such as product information and price points.

The webserver may identify the analytics server when the webserver determines that the user has interacted with the interactive graphical element 320. For instance, the webserver may utilize one or more APIs to transmit a notification to the analytics server. Additionally or alternatively, the webserver may execute a pluggable component (e.g., software script) that is communication with the analytics server. The pluggable component may transmit the notification directly to the analytics server.

The notification may include information associated with the transaction, such as the item to be purchased, price, vendor, delivery date, and other transaction data needed to identify an installment payment option. The notification may include a unique identifier associated with the user. For instance, the user may have previously stored their payment information (e.g., credit card information) via an account (e.g., an account with the merchant or the webserver). The user may log in and access the account to expedite the checkout process whereby the webserver retrieves the user's payment information to facilitate the transaction (e.g., prefill the input elements requesting the user's payment information). In those embodiments, the notification may include the user's payment information.

Additionally or alternatively, the notification may include a unique identifier associated with the user. For instance, the notification may include a name, account number, or other personally identifiable information associated with the user (e.g., social security number).

Using the information within the notifications, the analytics server may identify a customer profile associated with the user. For instance, the analytics server may query and retrieve a customer profile using the credit card information associated with the user (or other personally identifiable information included within the notification). The analytics server may determine that the user is an existing customer (e.g., has an active account with a financial institution associated with the analytics server). The analytics server may retrieve various personal and financial data included with in the customer profile.

Using the transaction data and the user data retrieved from the customer profile, the analytics server (or another server under direction of the analytics server) may calculate various installment payment options for the user. For instance, based on the credit worthiness of the user and the purchase price, the analytics server may generate three alternative installment plans for the user and the pending transaction.

The analytics server may instruct the webserver (via one or more API or the pluggable component) to direct the user to the alternative payment page 400, as depicted in FIG. 4.

The alternative payment page may include the graphical component 410 that displays a payment option selected by the user. The card information may be inputted directly by the user and/or may have been previously saved within a user profile. In some embodiments, the card information depicted in the graphical component 410 may have been used by the analytics server to retrieve data needed to calculate installment payment options. The installment payment option page 400 may also include the graphical component 420 that display the purchase amount.

The installment payment option page 400 may also include three alternative payments calculated by the analytics server to facilitate the pending transaction. Each installment payment option may include different attributes. For instance, the graphical component 430, may indicate a first installment payment option that comprises installments of $46/month for 60 months. The first installment payment option also includes a 7.99% APR. The graphical component 440 may indicate a second installment payment option that comprises installments of $55/month for 48 months. The second installment payment option also includes a 7.99% APR. The graphical component 450 may indicate a second installment payment option that comprises installments of $71/month for 36 months. The second installment payment option also includes a 7.99% APR.

Each graphical component 430-450 may be an interactive components configured to receive a selection by the user interacting with the installment payment option page 400. For instance, the user may select one of the payment options described above by clicking (or otherwise interacting with) the corresponding graphical component. Upon receiving an indication that the user has interacted with a graphical component, the webserver may transmit a notification to the analytics server informing the analytics server that a selection has been made and indicating which graphical component has been interacted with by the user.

The analytics server may then facilitate the transaction by transmitting the installment payment option selected by the user. For instance, the analytics server may transmit the attributes of the selected installment payment option to a second server where the second server can facilitate the transaction by transmitting the requested funds ($2,245.00) to an account associated with the merchant. The second server may also generate a new account associated with the newly created financial obligation associated with the user. For instance, if the user selects the first installment payment option, the second server may revise one or more data records within one or more databases indicating that the user is now responsible for monthly payments of $46 at a 7.99% APR for 60 months. In some embodiments, the analytics server may act as the analytics server and the second server. Therefore, all or at least part of the actions described herein as being performed by the second server may be performed by the analytics server itself.

In some configurations, the notification received via the webserver may not include enough data for the analytics server to identify or retrieve a customer profile associated with the user. Moreover, in some embodiments, the user may not have an account (or a customer profile) accessible to the analytics server. For instance, the user may not login to their account and may attempt to complete the transaction "as a guest" (e.g., without providing any data additional to their payment data). In another example, the user may not have a customer profile (or an account) stored within the databases accessible to the analytics server (e.g., the user does not have a credit card associated with the bank using the analytics server to provide installment payment options). In those embodiments, the analytics server may instruct the webserver (using APIs) or may directly display (using pluggable components) one or more input elements configured to receive user information. For instance, the analytics server may display an input element (e.g., text box or a radio button) requesting the user's personally identifiable information (e.g., full legal name, address, and social security number). The analytics server may then calculate one or more installment payment options based on the information inputted by the user (and purchase price received from the webserver).

FIG. 5 illustrates a flowchart depicting operational steps for dynamically revising webpage with consumer-customized payment options, in accordance with an embodiment. The method 500 describes how a server, such as the analytics server described in FIG. 5, displays various customer-specific interactive graphical user interfaces and elements configured to receive users' inputs. Even though the method 500 is described as being executed by the webserver, the method 500 can be executed by any server and/or locally within a user's computing device or as a browser extension. Additionally or alternatively, the method 500 can be executed by a webserver acting as both a webserver and the analytics server by hosting the website and generating the graphical elements described herein. Furthermore, other configurations of the method 500 may comprise additional or alternative steps or may omit one or more steps altogether.

At step 510, the webserver hosting the merchant webpage may, responsive to an input on a merchant webpage from a user, transmit to a first server, a request to display at least one interactive graphical element corresponding to an installment payment option on the webpage and a payment card number inputted by the user, whereby the first server: identifies an existing profile based on the payment card number without using personally identifiable information, and calculates an attribute of the installment payment option for the user based on the existing profile and without an input of personally identifiable information from the user.

The webserver may host a webpage for a merchant, such as depicted in FIGS. 3-4. When the user clicks on the installment option, the webserver may transmit a request to the analytics server. The request may also include a unique identifier associated with the user, such as the payment card number inputted by the user (e.g., credit card selected by the user or the credit card number directly inputted by the user within an input element) and/or login credentials from the user (e.g., login credentials inputted by the user to a customer profile associated with the merchant and/or the analytics server). As discussed herein, the analytics server may use the information within the request to identify a customer profile and calculate installment options for the user.

At step 520, the webserver may receive, from the first server, instructions to insert the at least one interactive graphical element comprising the installment payment option on the webpage having a visual characteristic of the webpage. The webserver may then receive an electronic message from the analytics server that includes an instruction to display one or more interactive graphical elements that display attributes of the calculated installment plan.

At step 530, the webserver may dynamically revise the webpage upon the input, the at least one interactive graphical element configured for selection by the user, whereby responsive to a selected interactive graphical element on the webpage, the server transmits an instruction to execute the installment payment option based on the selected interactive graphical element to a second server. Upon receiving the instruction, the webserver may dynamically revise the webpage by loading and rendering the interactive graphical elements received from the analytics server. When the user selects an option (by interacting with the rendered interactive graphical element), the webserver transmits an indication of the selection to the analytics server. The analytics server may then transmit an instruction to a second server to execute the installment payment option selected by the user, as discussed herein.

Figure 6:
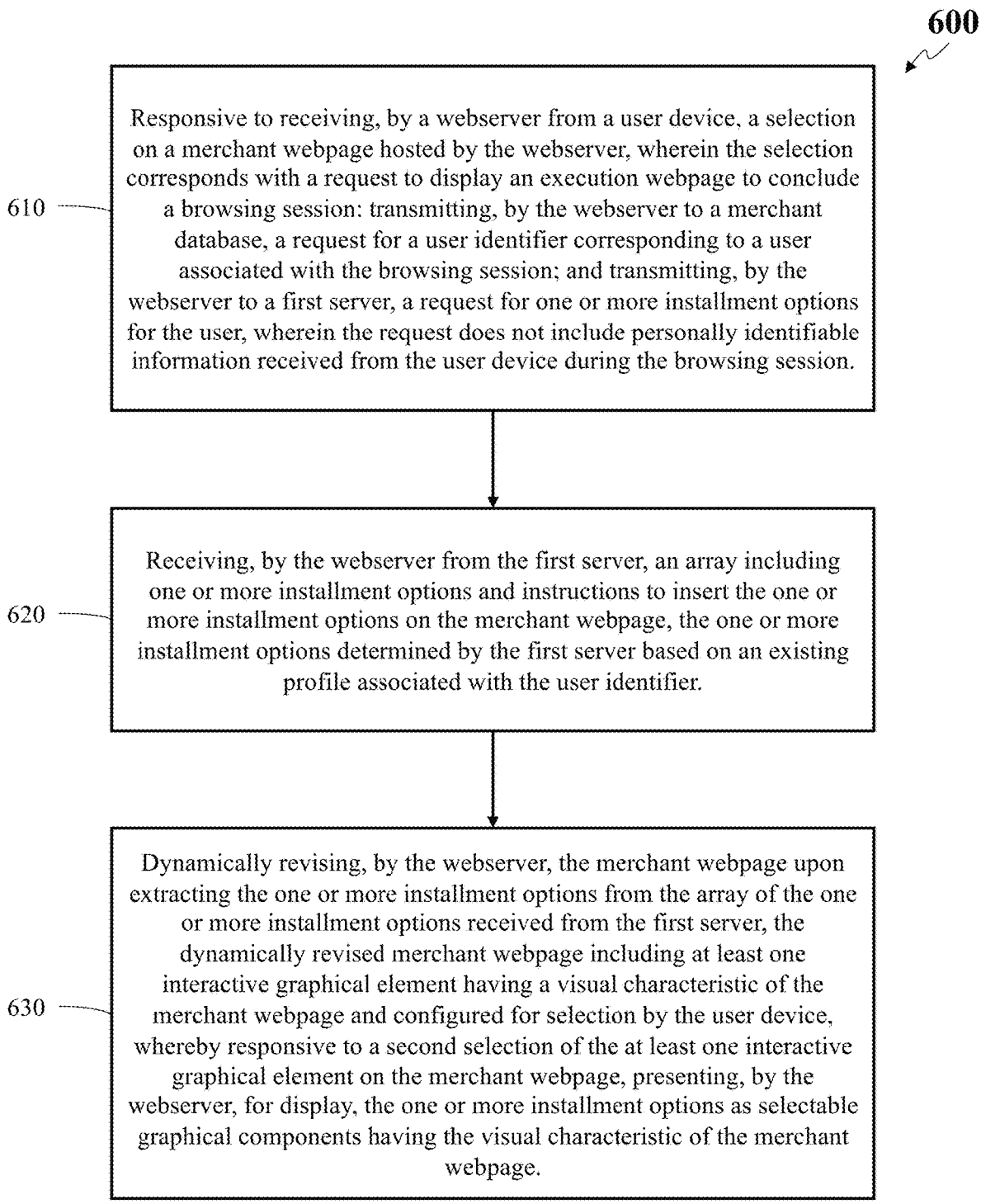
FIG. 6 illustrates a flowchart depicting operational steps for dynamically revising a webpage with consumer-customized payment options, in accordance with an embodiment.

Turning now to FIG. 6, an additional embodiment of the systems and methods described herein is illustrated in the flowchart of method 600. The method 600 describes how a server (or in some embodiments, one or more processors), such as the webserver described in FIG. 1, displays various customer-specific interactive graphical user interfaces and elements configured to receive users' inputs, such as through the user computing device of FIG. 1. Even though the method 600 is described as being executed by the webserver, the method 600 can be executed by any server and/or locally within a user's computing device or as a browser extension. Additionally or alternatively, the method 600 can be executed by a webserver acting as both a webserver and the analytics server by hosting the website and generating the graphical elements described herein. In some embodiments, the steps of method 600 may be individually executed by one or more servers (e.g., the webserver and/or analytics server of FIG. 1). Furthermore, other configurations of the method 600 may comprise additional or alternative steps or may omit one or more steps altogether.

At step 610, a webserver may, in response to receiving from a user device a selection on a merchant webpage hosted by the webserver, (1) transmit to a merchant database a request for a user identifier corresponding to a user associated with a browsing session and (2) transmit to a first server a request for one or more installment options for the user, wherein the request does not include personally identifiable information received from the user device during the browsing session. The selection may correspond with a request to display an execution webpage to conclude the browsing session.

According to at least one embodiment, a user may access a merchant's website that is hosted by the webserver. In accessing the merchant's website, the user initiates a browsing session which may include browsing through the merchant's website for one or more products to purchase. During the browsing session, the user may select one or more products to include in a digital "shopping cart." These selected products are saved by the webserver for later purchasing and/or further inspection. Upon completion of browsing, the user selects an interactive graphical component (e.g., a checkout button) to access an execution webpage. The execution webpage is generated and displayed by the webserver. In some embodiments, the execution webpage is a checkout webpage for completing a purchase of the products saved to the digital shopping cart.

In some embodiments, prior to the webserver generating and displaying the execution webpage, the webserver first transmits a request to a database (e.g., a merchant's database associated with the merchant webpage) for a user identifier. The user identifier may correspond to the user who initiated the browsing session or execution webpage. The user identifier can be any type of identification, but in an exemplary embodiment, the user identifier is a credit card number. The request may also be sent to a server (e.g., a merchant server) to access the database, for example, a merchant server may receive the request and access the merchant's database to retrieve a saved user identifier and transmit the user identifier back to the webserver. In some embodiments, the user may have saved the user identifier (e.g., a credit card number) with the merchant in a previous transaction or browsing session. For example, upon checking out in a previous browsing session, the user may have saved an inputted credit card number for future checkouts. Additional data may be saved with the user identifier, such as a security code, expiration date of the credit card, and/or a billing address. One or more of these additional identifiers may also be transmitted with the user identifier to the webserver.

Upon receiving the user identifier from the merchant server or database, the webserver then transmits a request to a first server (e.g., the analytics server of FIG. 1) for one or more installment plans for the user associated with the user identifier. The request for one or more installment plans includes, for example, the user identifier (e.g., the credit card number associated with the user) and a cost of one more items in the digital shopping cart.

At step 620, the webserver may receive from the first server (1) an array including one or more installment options and (2) instructions to insert the one or more installment options on the merchant webpage (e.g., the execution page), the one or more installment options determined by the first server based on an existing profile associated with the user identifier.

The first server may receive the installment option request from the webserver. Upon receiving the request, the first server cross-checks the user identifier received from the webserver against its own database of user identifiers. In some embodiments, the user identifier received by the webserver matches a user identifier in an existing profile saved with the first server. In such embodiments, the first server may determine that the user associated with the request for one or more installment options qualifies for one or more installment options. The first server calculates one or more attributes for each of the one or more installment options, as described herein. These attributes for the one or more installment options are transmitted back to the webserver with instructions for displaying them. The installment options are transmitted to the webserver in an array with the corresponding attributes included. The various calculated attributes may be included in the array in a format in which the webserver may extract the relevant attributes for each installment option. For example, a first installment option may include attributes of monthly amounts, APR, number of installments, etc. Each of these attributes may be stored in individual cells within a row in the array. In an example, each installment option is stored in a row or column of the array. In addition to the installment options, the first server transmits to the webserver instructions on displaying the one or more installment options on the merchant webpage (or execution webpage). These instructions may include, for example, attributes of the one or more installment plans to display, visual characteristics to apply to the one or more installment plans, etc.

At step 630, the webserver may dynamically revise the merchant webpage upon extracting the one or more installment options from the array of the one or more installment options received from the first server. The dynamically revised merchant webpage may include at least one interactive graphical element having a visual characteristic of the merchant webpage and configured for selection by the user device, whereby responsive to a second selection of the at least one interactive graphical element on the merchant webpage, the webserver may present for display the one or more installment options as selectable graphical components having the visual characteristic of the merchant webpage, in accordance with the instructions received from the first server.

In the embodiment described above, there exists a distinction between what the webserver displays to the user and the information that the webserver has access to. By way of example, the user's selection to generate the execution page initiates two additional actions unbeknownst to the user: the webserver (1) first transmits to the merchant server the request for a user identifier and (2) upon receiving the user identifier, requests installment options from the first server. Beyond those initial actions, the webserver further extracts the individual installment plans from an array received from the first server. Upon extracting the individual installment plans, the webserver has access to the installment options available to the user from the first server. However, as illustrated in step 630, the webserver does not immediately present for display the installment options to the user. At this point the webserver now dynamically revises the merchant webpage to generate the requested execution page and presents an interactive element through which the user may transmit instructions to the webserver to present the installment options. In so doing, the webserver obfuscates the installment options until the user affirmatively selects an option to display them. If no installment options are available, the webserver does not display the interactive element to display installment options.

This paradigm of obfuscating known installment options until a user affirmatively requests to display installment options provides various technical advantages, such as avoiding overwhelming a user with choices at the beginning of the checkout process on the execution page, thus decreasing loss sales due to non-completed orders caused from overwhelmed users. An additional advantage is avoiding a user selecting an option to display installment options only to have the webserver determine that no installment options are available, thus frustrating the user and causing friction (and loss sales) in the checkout process.

In some embodiments, the user selects an installment option, and the webserver transmits an instruction to a second server to execute an installment plan with the attributes of the selected installment option.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, function, procedure, subroutine, subprogram, or the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code, it being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that is accessible by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. "Disk" and "disc", as used herein, include compact disc (CD), laser disc, optical disc, digital versatile disc (DVD), floppy disk, and Blu-ray disc formats, wherein "disks" reproduce data magnetically, while "discs" reproduce data optically with lasers. Combinations of the above should also be included within the scope of computer-readable media. Additionally, the operations of a method or algorithm may reside as one or any combination or set of codes and/or instructions on a non-transitory, processor-readable medium and/or computer-readable medium, which may be incorporated into a computer program.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What we claim is:

1. A method comprising:
   responsive to receiving, by a merchant webserver from a user device through a pluggable component executed by the merchant webserver, a selection on a merchant webpage hosted by the merchant webserver, wherein the selection corresponds to a request to display an execution webpage to conclude a browsing session:
   transmitting, by the merchant webserver to a merchant database associated with the merchant webserver, a second request for a user identifier corresponding to a user associated with the browsing session; and
   transmitting, by the merchant webserver to a first server, a third request for one or more installment options for the user, wherein the request includes the user identifier and does not include personally identifiable information received from the user device during the browsing session;
   receiving, by the merchant webserver from the first server through the pluggable component, an array including the one or more installment options and instructions to insert on the merchant webpage one or more selectable graphical components corresponding to the one or more installment options, the one or more selectable graphical components having a visual characteristic that matches at least one element of the merchant webpage, the one or more installment options determined by the first server based on an existing profile associated with the user identifier; and
   dynamically revising, by the merchant webserver, the merchant webpage upon extracting the one or more installment options from the array of the one or more installment options received from the first server, the dynamically revised merchant webpage including at least one interactive graphical element having the visual characteristic of the merchant webpage and configured for selection by the user device, whereby responsive to a second selection of the at least one interactive graphical element on the merchant webpage, presenting, by the merchant webserver, for display, the one or more selectable graphical components corresponding to the one or more installment options.

2. The method of claim 1, wherein the merchant webserver communicates with the first server through the pluggable component.

3. The method of claim 1, wherein the merchant webserver communicates with the first server through an application programming interface.

4. The method of claim 1, wherein the first server calculates an attribute for each of the one or more installment options for the user based on the existing profile, wherein the attribute for each of the one or more installment options is one of a monthly amount, a number of installments, or an interest rate.

5. The method of claim 1, wherein the existing profile is associated with the first server and the first server determines the one or more installment options based on data associated with the user that is included in the existing profile.

6. The method of claim 1, wherein the user identifier is a credit card number.

7. The method of claim 1, wherein the execution webpage is a checkout page of a merchant associated with the browsing session.

8. The method of claim 1, further comprising:
receiving, by the merchant webserver from the user device, a third selection of an installment option from the one or more installment options; and
transmitting, by the merchant webserver to a second server, instructions to execute the installment option.

9. A system comprising:
a first server; and
a merchant webserver, the merchant webserver comprising one or more processors and machine-readable, non-transitory computer media that when read by the one or more processors, cause the one or more processors to execute a method comprising:
responsive to receiving, by the merchant webserver from a user device through a pluggable component executed by the merchant webserver, a selection on a merchant webpage hosted by the merchant webserver, wherein the selection corresponds to a request to display an execution webpage to conclude a browsing session:
transmitting, by the merchant webserver to a merchant database associated with the merchant webserver, a second request for a user identifier corresponding to a user associated with the browsing session; and
transmitting, by the merchant webserver to the first server, a third request for one or more installment options for the user, wherein the request includes the user identifier and does not include personally identifiable information received from the user device during the browsing session;
receiving, by the merchant webserver from the first server through the pluggable component, an array including the one or more installment options and instructions to insert one or more selectable graphical components corresponding to the one or more installment options on the merchant webpage, the one or more selectable graphical components having a visual characteristic that matches at least one element of the merchant webpage, the one or more installment options determined by the first server based on an existing profile associated with the user identifier; and
dynamically revising, by the merchant webserver, the merchant webpage upon extracting the one or more installment options from the array of the one or more installment options received from the first server, the dynamically revised merchant webpage including at least one interactive graphical element having the visual characteristic of the merchant webpage and configured for selection by the user device, whereby responsive to a second selection of the at least one interactive graphical element on the merchant webpage, presenting, by the merchant webserver, for display, the one or more selectable graphical components corresponding to the one or more installment options.

10. The system of claim 9, wherein the merchant webserver communicates with the first server through the pluggable component.

11. The system of claim 9, wherein the merchant webserver communicates with the first server through an application programming interface.

12. The system of claim 9, wherein the first server calculates an attribute for each of the one or more installment options for the user based on the existing profile, wherein the attribute for each of the one or more installment options is one of a monthly amount, a number of installments, or an interest rate.

13. The system of claim 9, wherein the existing profile is associated with the first server and the first server determines the one or more installment options based on data associated with the user that is included in the existing profile.

14. The system of claim 9, wherein the user identifier is a credit card number.

15. The system of claim 9, wherein the execution webpage is a checkout page of a merchant associated with the browsing session.

16. The system of claim 9, further comprising:
receiving, by the merchant webserver from the user device, a third selection of an installment option from the one or more installment options; and
transmitting, by the merchant webserver to a second server, instructions to execute the installment option.

17. A method comprising:
responsive to receiving, by a merchant webserver from a user device through a pluggable component executed by the merchant webserver, a selection on a merchant webpage hosted by the merchant webserver, wherein the selection corresponds to a request to display an execution webpage to conclude a browsing session:
transmitting, by the merchant webserver to a merchant database associated with the merchant webserver, a second request for a user identifier corresponding to a user associated with the browsing session; and
transmitting, by the merchant webserver to a first server, a third request for one or more installment options for the user, wherein the request includes the user identifier and does not include personally identifiable information received from the user device during the browsing session;
receiving, by the merchant webserver from the first server through the pluggable component, an array including the one or more installment options and instructions to insert one or more selectable graphical components corresponding to the one or more installment options on the merchant webpage, the one or more selectable graphical components having a visual characteristic that matches at least one element of the merchant webpage, the one or more installment options determined by the first server based on an existing profile associated with the user identifier; and
dynamically revising, by the merchant webserver, the merchant webpage upon extracting the one or more installment options from the array of the one or more installment options received from the first server, the dynamically revised merchant webpage including at least one interactive graphical element corresponding to an installment option of the one or more installment options and having the visual characteristic of the merchant webpage and configured for selection by the user device, whereby responsive to a second selection of the at least one interactive graphical element on the merchant webpage, transmitting, by the merchant webserver to a second server, instructions to execute the installment option.

18. The method of claim 17, wherein the merchant webserver communicates with the first server through the pluggable component.

19. The method of claim 17, wherein the merchant webserver communicates with the first server through an application programming interface.

20. The method of claim 17, wherein the first server calculates an attribute for each of the one or more installment options for the user based on the existing profile, wherein the attribute for each of the one or more installment options is one of a monthly amount, a number of installments, or an interest rate.

\* \* \* \* \*